United States Patent
Heise

(10) Patent No.: US 9,452,742 B2
(45) Date of Patent: Sep. 27, 2016

(54) ELECTROHYDRAULIC PRESSURE CONTROL DEVICE FOR VEHICLE BRAKE SYSTEMS

(71) Applicant: Continental Teves AG & Co. oHG, Frankfurt (DE)

(72) Inventor: Andreas Heise, Erzhausen (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 45 days.

(21) Appl. No.: 14/380,992

(22) PCT Filed: Feb. 28, 2013

(86) PCT No.: PCT/EP2013/054111
§ 371 (c)(1),
(2) Date: Aug. 26, 2014

(87) PCT Pub. No.: WO2013/127969
PCT Pub. Date: Sep. 6, 2013

(65) Prior Publication Data
US 2015/0028665 A1    Jan. 29, 2015

(30) Foreign Application Priority Data
Feb. 29, 2012   (DE) .................. 10 2012 203 159

(51) Int. Cl.
*B60T 8/36*    (2006.01)
*B60T 8/17*    (2006.01)
(Continued)

(52) U.S. Cl.
CPC .................. *B60T 8/17* (2013.01); *B60T 8/368* (2013.01); *B60T 13/20* (2013.01); *B60T 13/686* (2013.01)

(58) Field of Classification Search
CPC ........ B60T 8/368; B60T 8/3675; B60T 8/17; B60T 13/20; B60T 13/686; Y10T 137/87885; Y10S 303/10; F16H 61/0003
USPC ................ 303/119.1, 119.2, 119.3, DIG. 10, 303/116.4; 137/884; 251/129.15; 439/722
See application file for complete search history.

(56) References Cited

U.S. PATENT DOCUMENTS 4,820,224 A * 4/1989 Lemche ................ F16B 21/071
                                                                  348/825
5,127,440 A * 7/1992 Maas .................... B60T 8/3675
                                                                  137/560

(Continued)

FOREIGN PATENT DOCUMENTS

DE          19519888        12/1996
DE          19639198         3/1997

(Continued)

OTHER PUBLICATIONS

International Search Report for PCT/EP2013/054111 mailed Aug. 16, 2013.

(Continued)

*Primary Examiner* — Melody Burch
(74) *Attorney, Agent, or Firm* — RatnerPrestia

(57) ABSTRACT

The invention relates to an electrohydraulic pressure control device for vehicle brake systems, including at least one electronic control unit, at least one hydraulic unit and at least one electric motor for driving a hydraulic pump, wherein the electronic control unit is mechanically connected to the hydraulic unit and is sealed off from the outer environment in at least one connection zone to the hydraulic unit by a circumferential, in particular elastic sealing material, and the sealing material extends along an edge of the substantially cuboid-shaped hydraulic unit, wherein the edge is formed by a face of the cuboid-shaped hydraulic unit facing the electronic control unit and at least one face of the cuboid-shaped hydraulic unit not facing the electronic control unit, and the sealing material at least partially covers both cuboid faces in the connection zone and/or sealing zone.

7 Claims, 7 Drawing Sheets

(51) Int. Cl.
*B60T 13/20* (2006.01)
*B60T 13/68* (2006.01)
*B60T 13/74* (2006.01)

(56) References Cited

U.S. PATENT DOCUMENTS

| | | | |
|---|---|---|---|
| 5,722,741 A * | 3/1998 | Steffes | B60R 16/0239 303/119.2 |
| 5,766,026 A | 6/1998 | Cooper | |
| 6,148,855 A * | 11/2000 | Rauner | B60T 8/3675 137/560 |
| 6,550,873 B1 * | 4/2003 | Hengler | B60T 8/368 303/116.4 |
| 6,662,825 B2 * | 12/2003 | Frank | B60T 8/362 137/557 |
| 2005/0057093 A1 | 3/2005 | Segawa | |

FOREIGN PATENT DOCUMENTS

| | | |
|---|---|---|
| DE | 102005059941 | 8/2006 |
| DE | 102006037695 | 2/2008 |

OTHER PUBLICATIONS

Written Opinion of the International Searching Authority for International Application No. PCT/EP/2013/054111, including an English translation.

* cited by examiner

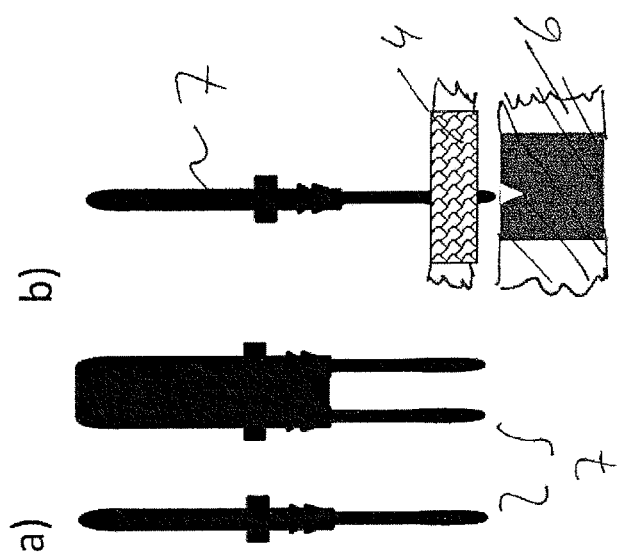
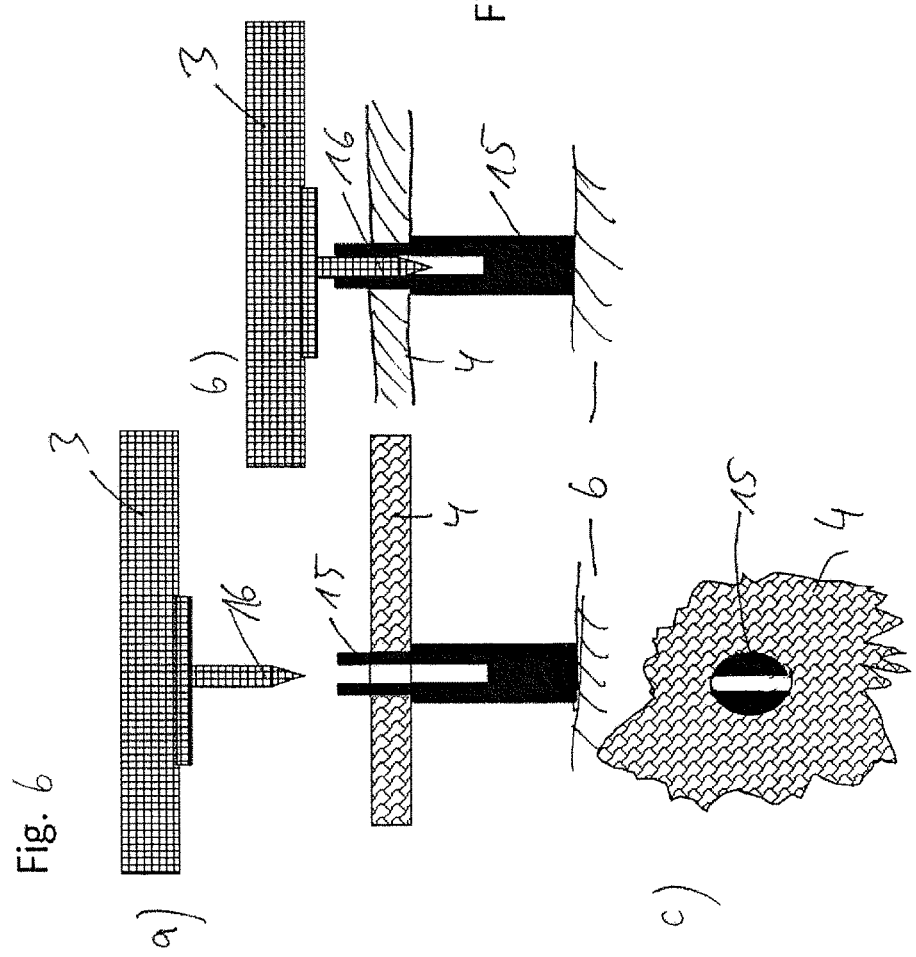

ELECTROHYDRAULIC PRESSURE CONTROL DEVICE FOR VEHICLE BRAKE SYSTEMS

CROSS REFERENCE TO RELATED APPLICATIONS

This application is the U.S. National Stage Application of PCT International Application No. PCT/EP2013/054111, filed Feb. 28, 2013, which claims priority to German Patent Application No. 10 2012 203 159.6, filed Feb. 29, 2012, the contents of such applications being incorporated by reference herein.

FIELD OF THE INVENTION

The present invention relates to an electrohydraulic pressure control device for vehicle brake systems.

BACKGROUND OF THE INVENTION

DE 10 2005 059 941 A1, which is incorporated by reference, describes an electrohydraulic pressure control device for motor vehicle brake systems comprising an electronic control unit, a hydraulic unit and an electric motor, which is controlled by means of an adapter passed through the hydraulic unit. The electronic control unit is connected to the hydraulic unit in a sealed manner, wherein the hydraulic unit has a groove, in which a seal is guided, on a circumferential surface of a side facing the electronic control unit, wherein an annular feature that is bent around in the sealing zone, said feature being oriented into the interior of the metal housing of the electronic control unit, forms a clamped joint with a sealing action in combination with the groove. By virtue of the stiffness of the material of a metal housing cover which is secured on a housing frame, the cover can be mounted on the hydraulic unit by means of screws without the use of metal sleeves in the housing frame that are otherwise customary in the case of plastic. Moreover, bending around of the metal cover and, as a consequence, a clamping action with a housing wall of the housing frame on the side of a plug is described, wherein screws are used on the opposite side of the cover for the purpose of tightening against the housing frame.

In order to limit the weight and space requirement, the housings of the electronic control units are manufactured with as little material as possible. Particularly when shear loads occur, however, leaks may occur in the seals owing to thin housing walls and little reinforcement. The entry of liquid into the housing can lead to faults in subassemblies within the overall pressure control device and can cause failure of the corresponding vehicle brake system.

SUMMARY OF THE INVENTION

An aspect of the present invention provides an electrohydraulic pressure control device which has increased tolerance to shear loads and, at the same time, can be produced at low cost.

An aspect of the invention describes an electrohydraulic pressure control device for vehicle brake systems, comprising at least one electronic control unit, at least one hydraulic unit and at least one electric motor for driving a hydraulic pump, wherein the electronic control unit is mechanically connected to the hydraulic unit and is sealed off from an external environment in at least one zone of connection to the hydraulic unit by means of a circumferential, in particular annular flexible, sealing material, and the electronic control unit comprises a housing and at least one plug having a plurality of contact pins and/or at least one connection line for electrical contacting by means of at least one connection plug, wherein the plug is arranged on a side of the housing of the electronic control unit which faces away from the hydraulic unit, and the housing of the electronic control unit surrounds at least one valve coil for controlling hydraulic valves and at least one circuit board for holding electrical and/or electronic components, wherein the contact pins and the valve coil and at least one terminal of the electric motor are each connected in an electrically conductive manner to the circuit board, wherein the pressure control device is furthermore characterized in that the sealing material extends along an edge of the substantially cuboid-shaped hydraulic unit, wherein the edge is formed by a cuboid face of the hydraulic unit which faces the electronic control unit and at least one cuboid face of the hydraulic unit which does not face the electronic control unit, and the sealing material at least partially covers both cuboid faces in the zone of connection and/or sealing zone.

The invention advantageously reduces the shear loads on the seal of the electronic control unit and hence avoids possible ingress of liquid into the electronic control unit and the occurrence of faults.

The sealing material, which, in particular, additionally acts as an adhesive, preferably has an increased fluidity during an assembly process and subsequently is subject to a curing operation. By virtue of this measure, the sealing material advantageously provides a seal even when forces, in particular shear forces, act on the electronic control unit and/or on the hydraulic unit.

According to a preferred embodiment, the electronic control unit comprises at least one support element, wherein the support element is supported against the hydraulic unit and the housing of the electronic control unit in such a way that the support element and the housing of the electronic control unit have a minimum spacing with respect to the hydraulic unit, particularly in the zone of connection and/or sealing zone with respect to the hydraulic unit. The minimum spacing ensured advantageously creates a defined sealing zone which prevents the occurrence of leaks, which could be caused, for example, by the hydraulic unit and the electronic control unit pressing against one another before the sealing material has cured.

According to an advantageous development of the invention, the support element and the housing of the electronic control unit and the circuit board have at least one common mechanical connection, in particular a connection which is effective only in combination, which allows fixing relative to one another. Thus, it is only when these three components are brought together that the circuit board and the support element are fixed, and this advantageously allows simplifications to be made in assembly processes, for example.

The housing of the electronic control unit is preferably connected materially to the plug and/or is manufactured from a plastic and, in particular, is of substantially one-piece design. It is thereby advantageously possible to eliminate sealing locations, thereby reducing the likelihood of faults. It is furthermore possible to reduce the weight of the pressure control device and production costs.

As a particularly preferred option, the mechanical connection of the electronic control unit to the hydraulic unit is formed while avoiding one or more screwed joints. A screwless connection of the electronic control unit to the hydraulic unit is thus advantageously achieved, thereby making it possible to save on materials and production costs.

It is also advantageous that smaller dimensions of the overall pressure control device are obtained by virtue of the elimination of screw connection zones.

As a particularly preferred option, the housing of the electronic control unit has latching means, which latch into recesses and/or latching projections on the hydraulic unit. The advantage is that mechanical stability is increased and, in particular, that a sealing material acting as an adhesive is relieved of mechanical loads, in particular tensile loads.

According to a preferred embodiment, the electric motor is surrounded by the electronic control unit. The advantage is that control of the electric motor can be performed without a motor contact passed through the hydraulic unit, which lowers the susceptibility to faults and reduces the space requirement. Moreover, it is then possible to omit a seal that would otherwise have to be provided between the electric motor and the hydraulic unit, thereby eliminating another possible entry point for liquids. In addition, the housing of the electric motor and/or the holders or fastenings of the housing of the electric motor can preferably be provided in an embodiment that is not watertight since the housing of the electronic control unit seals off by means of the seal with the hydraulic unit with respect to liquid media in the environment of the pressure control device.

According to a preferred embodiment of the invention, the support element rests on the hydraulic unit by means of at least one base part, wherein the base part is connected to the support element, in particular materially. In the zone of connection of the electronic control unit to the hydraulic unit, it is particularly preferable if the sealing material partially or completely fills at least one volume, produced by the base part, between the support element and the hydraulic unit and/or at least one volume between the hydraulic unit and the housing of the electronic control unit and/or at least one volume between the support element and the housing of the electronic control unit. A seal which is of substantially sufficient thickness and is thus substantially reliable and tolerant of loads, in particular substantially relieved and/or freed of tensile stress, is thereby advantageously created.

According to a particularly preferred embodiment, at least one peg connected, in particular materially connected, to the support element and/or the housing of the electronic control unit is inserted into a through opening in the circuit board to form the mechanical connection of the support element and the housing of the electronic control unit and the circuit board, wherein at least one expansion means inserted into the peg expands the peg in such a way that there is at least partially mechanical fixing. The expansion means is preferably connected materially to the housing.

The housing of the electronic control unit preferably comprises housing pins which are introduced into openings in the support element. As a result, the housing and the support element in combination with the hydraulic unit advantageously support each other, thereby producing, inter alia, minimum spacings to form volume for the sealing material.

According to a preferred embodiment, at least one flexible element is provided, which rests on the valve coil and is connected to the support element, in particular materially. It is advantageous that the flexible element can be produced in a common production step corresponding to the production of the support element, e.g. in a common injection molding process, as a result of which, in turn, there is no need to provide any metal flexible elements.

The valve coil is preferably connected, in particular additionally connected, to the hydraulic unit by means of an adhesive. To connect the valve coil to the hydraulic unit, use is preferably made of the sealing material which is used for sealing the housing of the electronic control unit with respect to the hydraulic unit. This advantageously assists the flexible element with the tolerance-prone mechanical positioning of the valve coils, particularly for the case of any aging of a material used for the flexible element.

The contact pin is preferably electrically connected in an electrically conductive manner to the circuit board by means of press-in contacts, and the contact pin has at least one sawtooth profile, wherein the sawtooth profile engages in recesses in the housing of the electronic control unit. By means of the contact pin, at least one further, at least partially mechanical fixing of the circuit board to the housing of the electronic control unit is preferably provided. As a supplementary or alternative measure, the contact pins can preferably be surrounded by the housing of the electronic control unit to provide mechanical fixing, this being achieved by means of injection molding, for example. The contact pin furthermore preferably has stop shoulders which rest on the housing of the electronic control unit. The advantage is that the circuit board is positioned in the press-in zone, in particular by the contact pins, and that essentially only small forces or no forces are transmitted to the circuit board as a result of the insertion or removal of a connection plug, thereby making it possible to avoid faults in the electronic components.

According to a preferred embodiment, at least one spring arm is provided, which is connected to the support element and rests on the hydraulic unit. The spring arm presses the hydraulic unit onto the latching means of the housing, this being advantageous especially during the curing process of the sealing material.

BRIEF DESCRIPTION OF THE DRAWINGS

Further preferred embodiments will become apparent from the dependent claims and from the following description of an illustrative embodiment with reference to figures.

In schematic form:

FIGS. 5*a*-5*b* show an illustrative embodiment of the contact pins for low- and high-current carrying capacity, and FIGS. 6*a*-6*c* show an illustrative embodiment of the mechanical fixing of the circuit board by means of a peg and expansion means.

DETAILED DESCRIPTION OF THE PREFERRED EMBODIMENTS

In order to allow brief and simple description of the illustrative embodiments, identical elements are provided with identical reference signs, and in each case only the details essential to the invention are explained.

Figure 1:
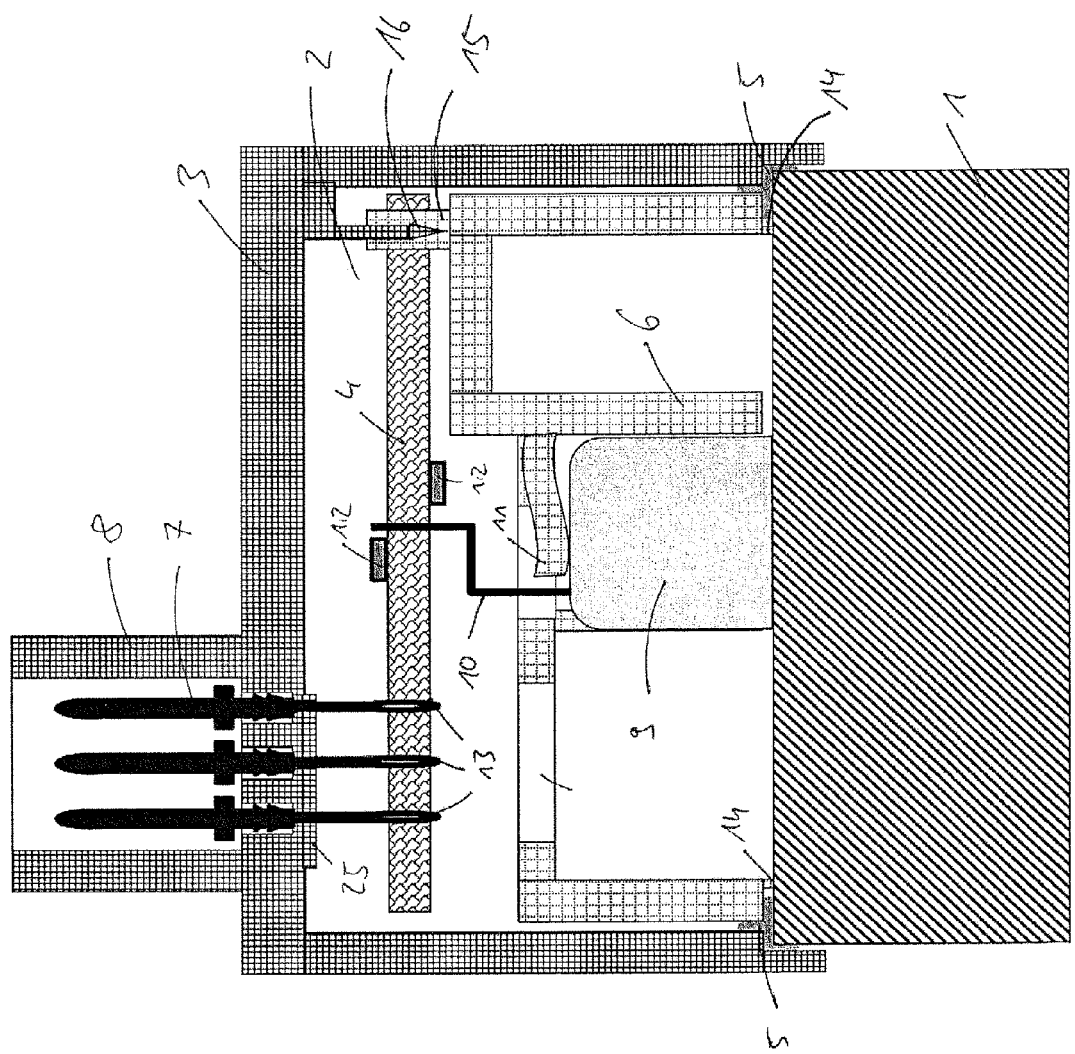
FIG. 1 shows an illustrative embodiment of the electrohydraulic pressure control device according to the invention for a vehicle brake system.

FIG. 1 shows an illustrative embodiment of the electrohydraulic pressure control device according to the invention for a vehicle brake system, e.g. for a two wheeled vehicle or a vehicle with more than two wheels, in section. Housing 3 of the electronic control unit 2 is sealed off essentially all round with respect to the environment by means of sealing material 5 in the zone of connection to the hydraulic control unit 1. Accordingly, sealing material 5 acts as a sealant and/or filler and can, in particular, furthermore be provided as an adhesive in order to effect or assist mechanical fixing of housing 3 on hydraulic unit 1.

Housing 3 furthermore surrounds circuit board 4 and support element 6. Electronic components 12, e.g. components for controlling the valve coil 9, are arranged in a manner known per se at least on one surface of circuit board 4. By way of example, mechanical fixing or relative positioning of circuit board 4 and/or support element 6 and/or housing 3 relative to one another is implemented by means of peg 15 in combination with expansion means 16. Here, expansion means 16, with housing 3 and peg 15, is connected materially to support element 6. By insertion of expansion means 16 into the peg 15, which has been introduced into a through opening in circuit board 4, peg 15 is expanded in such a way that the clamping forces produced in this way on the through opening bring about largely stable mechanical connection to circuit board 4, and circuit board 4 is thereby mechanically fixed. In addition, this mechanical connection technique is shown in detail views in FIGS. 6 *a*) to *c*), wherein FIGS. 6 *a*) and *b*) show expansion means 16 before and after introduction into peg 15, and FIG. 6 *c*) shows a plan view of the peg 15 inserted into the through opening in circuit board 4.

Figure 2:
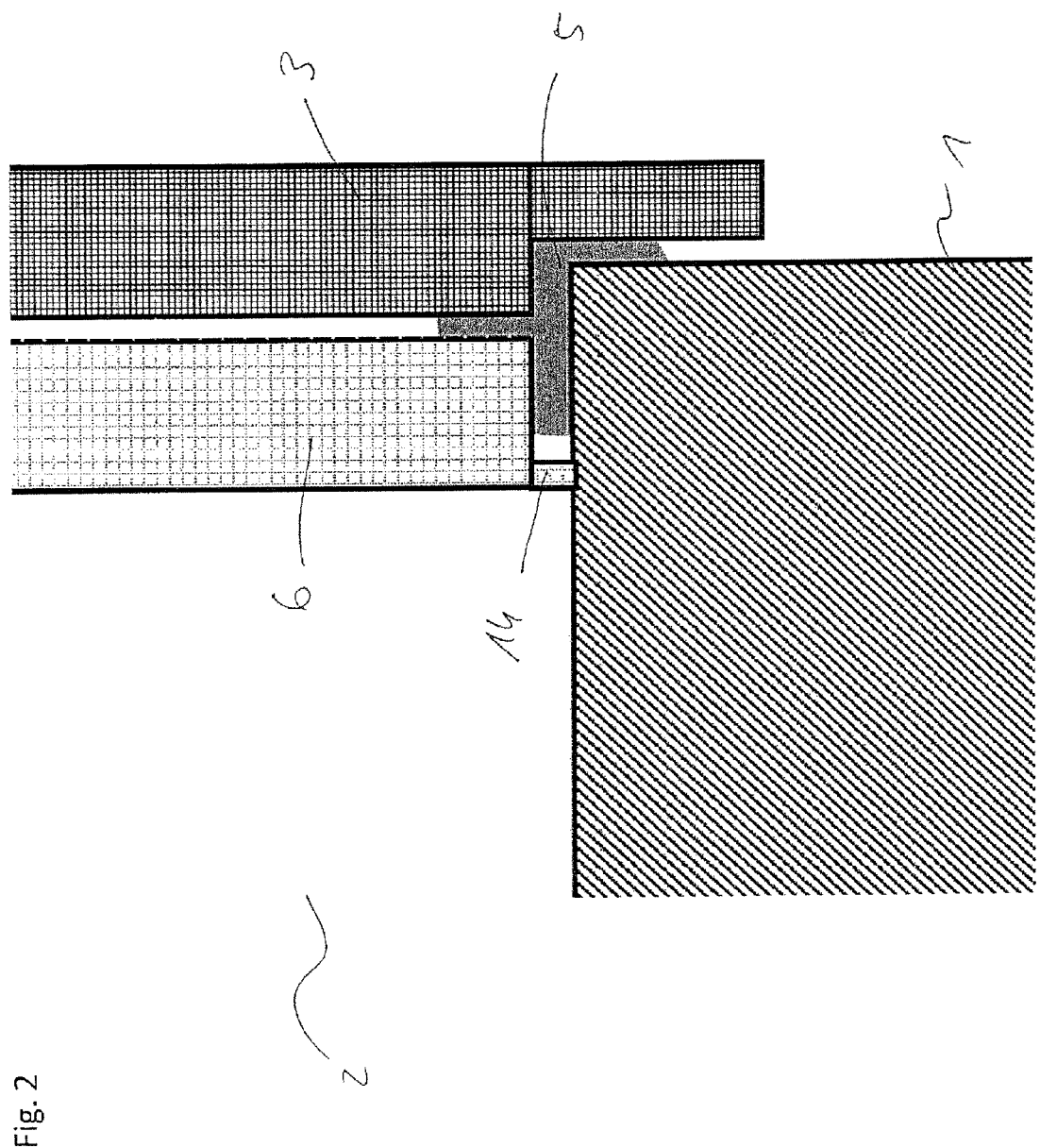
FIG. 2 shows an illustration of the sealing zone of the housing of the electronic control unit for the hydraulic unit.

Support element 6 substantially surrounds the valve coils 9 and electric motor 18 of the hydraulic pump, which are provided for hydraulic brake control, wherein initially only a single valve coil 9 is shown in FIG. 1. In order to achieve largely complete sealing by means of sealing material 5, the base part 14 is provided, said base part being connected materially to support element 6 and creating a limited spacing between hydraulic unit 1 and the support element 6, which is more extended, at least in the sealing zone relative to base part 14. Hydraulic unit 1 serves as a supporting surface for base part 14 and, via the latter, for the support element 6. The volume produced between hydraulic unit 1 and support element 6 by the different geometry of base part 14 and support element 6 in the sealing zone is partially or completely filled by sealing material 5. Sealing material 5 furthermore fills a volume between support element 6 and housing 3 and between housing 3 and hydraulic unit 1. For better illustration, the sealing zone between hydraulic unit 1 with the electronic control unit 2 is shown again on an enlarged scale in FIG. 2, it being stressed that the depictions do not allow conclusions to be drawn about actual proportions and/or dimensions. Tolerances in the spacing which occur in the course of production between housing 3 and support element 6 and also, for example, the hydraulic unit 1 can be compensated by sealing material 5. Support element 6 and hence also housing 3 can spring back slightly during assembly, with the result that base part 14 has a spacing with respect to hydraulic unit 1 during the curing process without the possibility of sealing material 5 being forced out during the assembly of the housing parts. A minimum spacing between housing 3 and hydraulic unit 1 is achieved through the construction of the pressure control device.

Valve coil 9 is connected at least in an electrically conductive manner to circuit board 4 by means of connection contact 10, by which means these are controlled in a manner known per se in order to actuate hydraulic valves. The flexible element 11, which is connected to support element 6, in particular connected materially thereto, serves to obtain flexible or tolerance-compensating mechanical positioning of valve coil 9. As an alternative, the flexible element 11 can also be connected to valve coil 9 and/or, as a departure from the example illustrated as a spring arm, can be a bead consisting of a flexible material, e.g. silicone.

Housing 3 of the electronic control unit 2 furthermore comprises plug 8 for making electrical contact between the electrohydraulic pressure control device and, for example, at least one vehicle electrical system and/or vehicle bus system using at least one connection plug or coupling (not shown). To form plug contacts of an electrical connecting arrangement of plug 8 with a connection plug, electrically conductive contact pins 7 are passed through housing 3 in the region of plug 8, said pins being produced from stamped sheet, in particular. The contact pins 7 are each pressed into circuit board 4 by means of press-in contact 3 within the electronic control unit 2. Alternative electrically conductive types of connection, e.g. soldered or welded joints, are likewise included by the present invention. For mechanical fixing, as shown in the illustrative embodiment, the contact pins 7 can have sawtooth profiles, for example, which engage in recesses in housing 3 and, as a result, can absorb forces, especially those resulting from removal of a connection plug. To relieve circuit board 4 with respect to forces which occur when plugging in a connection plug, the contact pins 7 furthermore have stop shoulders, which rest on housing 3. In particular for increased force absorption of housing 3 and/or to seal the passing of contact pins 7 through housing 3 plug seal or thickening of housing 25 can be provided. Another embodiment of contact pin 7, especially for transmitting relatively high power, is illustrated in FIG. 5 *a*), this comprising two press-in contacts 13. In accordance with an embodiment illustrated by way of a detail in FIG. 5 *b*), press-in contact 13 preferably rests on support element 6 on the side of circuit board 4 facing away from the plug 8. In addition to the stop shoulders of contact pin 7, it is thereby possible to absorb forces during the plugging in of a connection plug, and a possibility of support for circuit board 4 can be achieved in this region of the electronic control unit 2.

Figure 3:
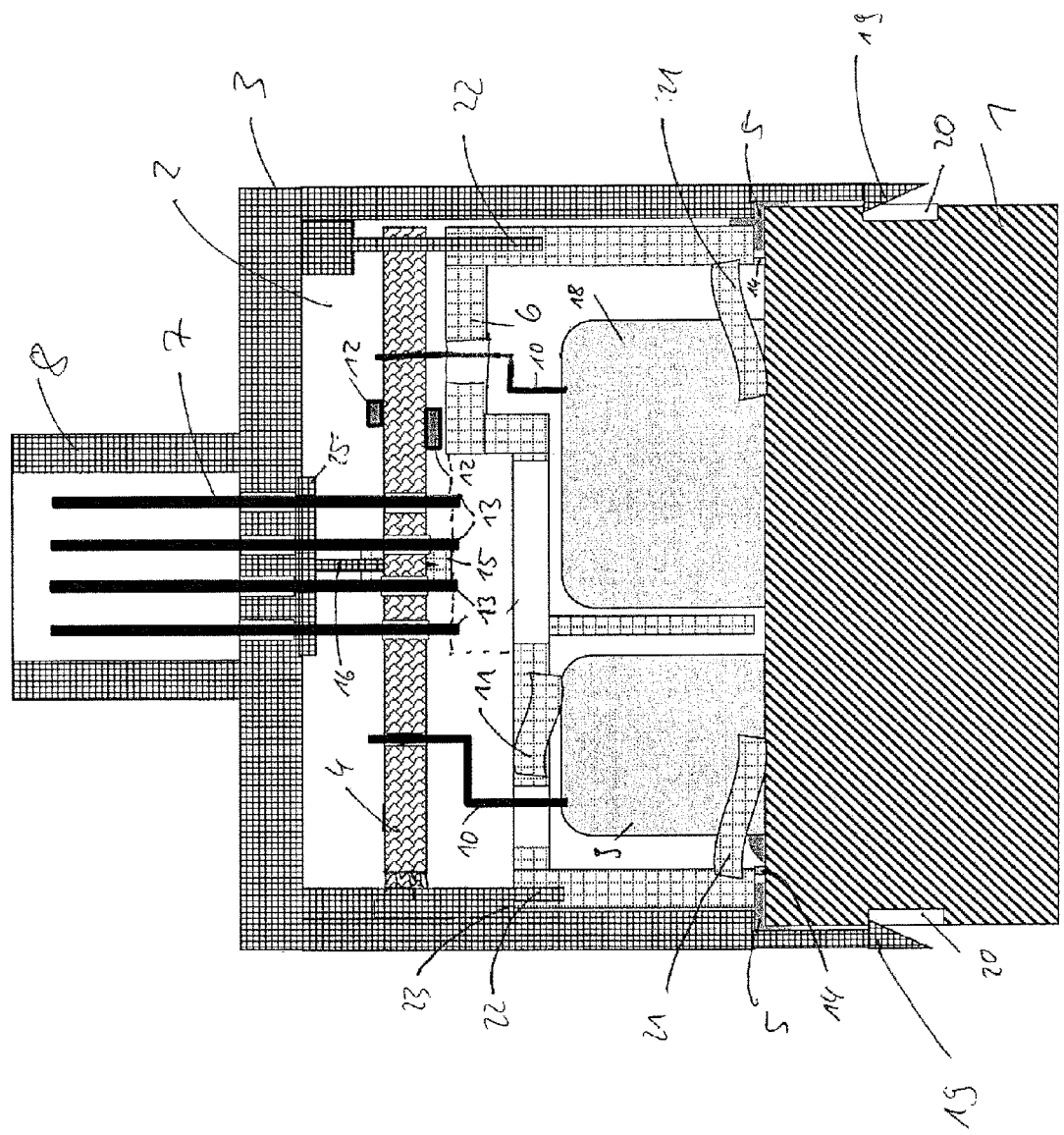
FIG. 3 shows a perspective, rotated through about 90° relative to FIG. 1, of the electrohydraulic pressure control device.

FIG. 3 shows the illustrative embodiment of the electrohydraulic pressure control device according to the invention shown in FIG. 1 in a perspective rotated through about 90°, with electric motor 18 of the hydraulic pump additionally being depicted. This is situated in the sealed housing volume of the electronic control unit 2 surrounded by housing 3. As an alternative, electric motor 18 can also be provided in a manner known per se outside housing 3, in particular however on an opposite side of hydraulic unit 1 from the electronic control unit 2, wherein contacting is accomplished in a manner known per se, e.g. through hydraulic unit 1. For the sake of greater clarity, the illustrative part of support element 6 which is connected to peg 15 is indicated only as a dashed line.

In order to relieve sealing material 5 of tensile forces between hydraulic unit 1 and electronic control unit 2, opposite latching means 19 are provided on housing 3, said latching means latching into recesses 20 in hydraulic unit 1, thereby implementing the mechanical connection of hydraulic unit 1 and electronic control unit 2. According to an embodiment which is not shown, hydraulic unit 1 has outward-facing latching projections, wherein the latching means 19 latch onto these in a corresponding manner. The sealing material 5 acting as an adhesive can additionally serve as a tension and compression relief means here, and, according to another embodiment which is preferred but not shown, the latching means 19 can be omitted. In addition to being connected to the flexible element 11, valve coil 9 can be connected to hydraulic unit 1 by means of adhesive, in particular the sealing material 5.

Housing 3 comprises sword-shaped housing pins 22, which are inserted into openings in support element 6 and, for example, form an end stop for support element 6 in combination with stop shoulders 23. In order to be able to achieve as large as possible an area of circuit board 4 which can be fitted with electronic components, one or more housing pins 22 can be passed through corresponding through openings in circuit board 4, and/or recesses can be provided on the edges of circuit board 4, as is likewise shown in FIG. 3.

Figure 4:
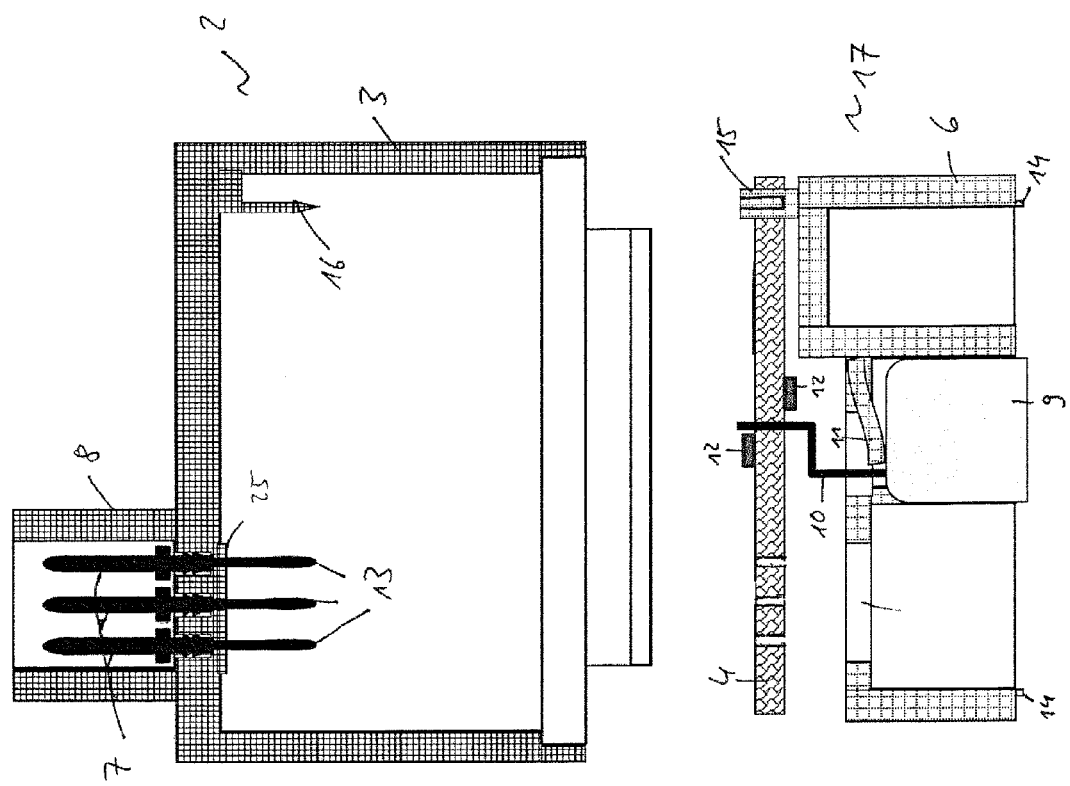
FIGS. 4*a*-4*c* show the assembly of the electrohydraulic pressure control device according to the invention.
Figure 4:
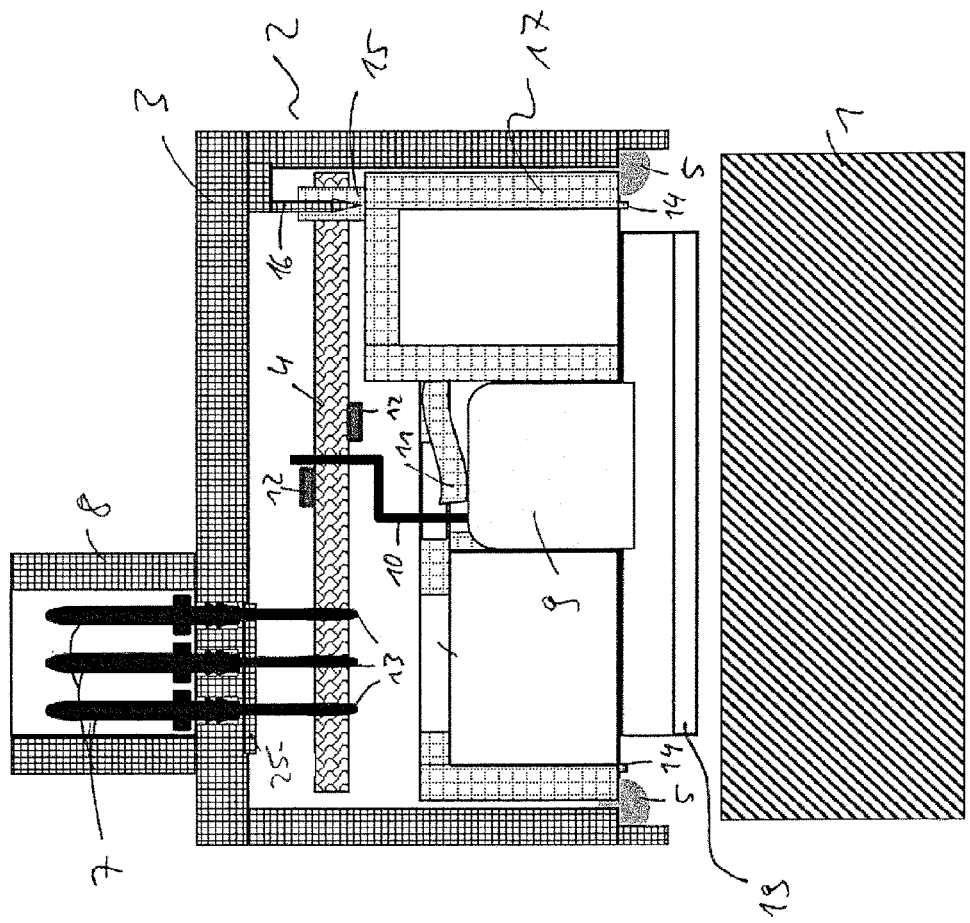
Figure 4:
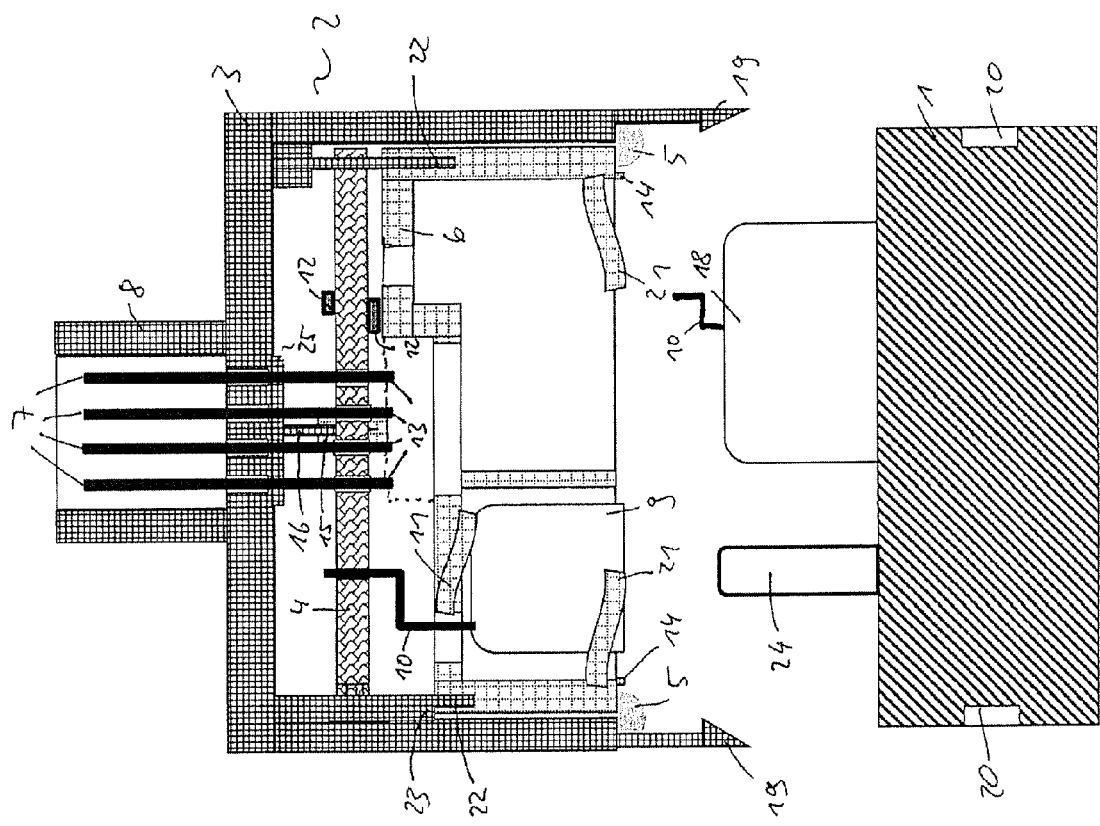

FIGS. 4 *a*), *b*) and *c*) show an illustrative procedure for assembling the electrohydraulic pressure control device according to the invention in accordance with the illustrative embodiment. The contact pins 7 are first of all inserted into the recesses or through openings provided for the purpose in the one-piece housing 3, produced from plastic, of the electronic control unit 2. The preassembled subassembly 17 comprising at least circuit board 4 and support element 6 is then inserted into housing 3 with peg 15 inserted into the through opening provided for the purpose in circuit board 4, and the valve coil 9 connected electrically to circuit board 4 via coil connection contact 10, or said subassembly has already been molded into housing 3 in the production process. The relative movements of housing 3 and the preassembled group are essentially insignificant. In this process, expansion means 16 expands peg 15, implementing the mechanical connection described above. The press-in contacts 13 are simultaneously pressed into openings provided for that purpose, while a counterforce acting counter to the press-in force is exerted on circuit board 4 in order to avoid mechanical deformations of circuit board 4. For this process, a tool is provided, in particular, which can exert the corresponding counterforce through a through opening arranged in this area in support element 6. In the further process steps, sealing material 5 is first of all applied and, subsequently, hydraulic unit 1 is mounted, wherein the latching means 19 latch into recess 20 and the preassembled subassembly 17 is sealed off from the external environment of the electrohydraulic control unit.

FIG. 4 *c*) shows by way of example the assembly of hydraulic unit 1 and electronic control unit 2 corresponding to FIG. 3 in a perspective rotated through about 90°. Valve dome 24 is additionally shown in comparison with FIG. 3, said dome being surrounded in the manner of a jacket after assembly by valve coil 9, as is known. Particularly for the curing process of sealing material 5, the spring arms 21 are advantageous and apply a force to hydraulic unit 1 in such a way that hydraulic unit 1 and thus the recesses 20 are pressed against the latching means 19.

Within the scope of the invention, the features mentioned and described above can be used not only in the respectively indicated combination but also in other combinations or in isolation.

LIST OF REFERENCE SIGNS

1 hydraulic unit
2 electronic control unit
3 housing of the electronic control unit
4 circuit board
5 adhesive/sealing material
6 support element
7 contact pin
8 plug
9 valve coil
10 connection contact
11 flexible element
12 electronic component
13 press-in contact
14 base part
15 peg
16 expansion means
17 preassembled subassembly
18 electric motor of the hydraulic pump
19 latching means
20 recess for latching means 19
21 spring arm
22 housing pin
23 stop shoulder of housing pin 21
24 valve dome
25 plug seal or thickening of housing

The invention claimed is:

1. An electrohydraulic pressure control device for vehicle brake systems, comprising at least one electronic control unit, at least one hydraulic unit and at least one electric motor for driving a hydraulic pump, wherein the electronic control unit is mechanically connected to the hydraulic unit and is sealed off from an external environment in at least one zone of connection to the hydraulic unit by a circumferential, flexible, sealing material, and the electronic control unit comprises a housing and at least one plug having a plurality of contact pins and/or at least one connection line for electrical contacting by at least one connection plug, wherein the plug is arranged on a side of the housing of the electronic control unit which faces away from the hydraulic unit, and the housing of the electronic control unit surrounds at least one valve coil for controlling hydraulic valves and at least one circuit board for holding electrical and/or electronic components, wherein the contact pins and the valve coil and at least one terminal of the electric motor are each connected in an electrically conductive manner to the circuit board, wherein the sealing material extends along an edge of the substantially cuboid-shaped hydraulic unit, wherein the edge is formed by a cuboid face of the hydraulic unit which faces the electronic control unit and at least one cuboid face of the hydraulic unit which does not face the electronic control unit, and the sealing material at least partially covers both cuboid faces in the zone of connection and/or sealing zone, and wherein a support element and the housing of the electronic control unit and the circuit board have at least one common mechanical connection, which is effective only in combination, which allows fixing relative to one another.

2. The electronic control unit as claimed in claim 1, wherein in the zone of connection of the electronic control unit to the hydraulic unit, the sealing material partially or completely fills at least one volume, produced by the base part, between the support element and the hydraulic unit and/or at least one volume between the hydraulic unit and the housing of the electronic control unit and/or at least one volume between the support element and the housing of the electronic control unit.

3. The electronic control unit as claimed in claim 1, wherein at least one peg connected to the support element and/or the housing of the electronic control unit is inserted into a through opening in the circuit board to form the mechanical connection of the support element and the housing of the electronic control unit and the circuit board, wherein at least one expansion means inserted into the peg expands the peg in such a way that there is at least partially mechanical fixing.

4. The electronic control unit as claimed in claim 3, wherein the expansion means is connected materially to the housing of the electronic control unit.

5. The electronic control unit as claimed in claim 1, wherein the housing of the electronic control unit comprises housing pins which are introduced into openings in the support element.

6. The electronic control unit as claimed in claim 1, wherein at least one flexible element is provided, which rests on the valve coil and is connected to the support element.

7. The electronic control unit as claimed in claim 1, wherein at least one spring arm is provided, which is connected to the support element and rests on the hydraulic unit.

* * * * *